United States Patent
Khang et al.

(10) Patent No.: US 11,813,578 B2
(45) Date of Patent: Nov. 14, 2023

(54) COMPOSITE MEMBRANE AND PREPARATION METHOD THEREOF

(71) Applicant: INDUSTRY-ACADEMIC COOPERATION FOUNDATION, YONSEI UNIVERSITY, Seoul (KR)

(72) Inventors: Dahl-Young Khang, Seoul (KR); Yong-Ho Choi, Gunpo-si (KR); Jia Lee, Goyang-si (KR)

(73) Assignee: INDUSTRY-ACADEMIC COOPERATION FOUNDATION, YONSEI UNIVERSITY, Seoul (KR)

(*) Notice: Subject to any disclaimer, the term of this patent is extended or adjusted under 35 U.S.C. 154(b) by 310 days.

(21) Appl. No.: 17/133,354

(22) Filed: Dec. 23, 2020

(65) Prior Publication Data
US 2021/0197139 A1 Jul. 1, 2021

(30) Foreign Application Priority Data
Dec. 27, 2019 (KR) .................. 10-2019-0176188

(51) Int. Cl.
*B01D 53/22* (2006.01)
*B01D 69/12* (2006.01)
*B01D 69/02* (2006.01)
*B01D 71/40* (2006.01)
*B01D 71/02* (2006.01)

(52) U.S. Cl.
CPC ........... *B01D 69/125* (2013.01); *B01D 69/02* (2013.01); *B01D 71/022* (2013.01); *B01D 71/024* (2013.01); *B01D 71/40* (2013.01)

(58) Field of Classification Search
CPC ............. B01D 2325/08; B01D 71/024; B01D 71/022; B01D 69/125; B01D 69/02; B01D 71/40
See application file for complete search history.

(56) References Cited

U.S. PATENT DOCUMENTS

| | | | | |
|---|---|---|---|---|
| 1,965,172 A | * | 7/1934 | Cammen ............... | B01D 63/082 210/493.4 |
| 4,172,038 A | * | 10/1979 | Appenzeller .......... | B01D 63/06 210/493.1 |
| 5,753,014 A | * | 5/1998 | Van Rijn ................ | B01D 69/02 96/13 |
| 5,996,246 A | * | 12/1999 | Marschke ............. | F26B 13/007 34/634 |
| 2004/0036993 A1 | * | 2/2004 | Tin ......................... | G02B 5/282 359/883 |
| 2004/0265182 A1 | * | 12/2004 | Chen .................. | B81C 1/00119 422/503 |
| 2005/0263452 A1 | | 12/2005 | Jacobson | |

(Continued)

FOREIGN PATENT DOCUMENTS

| | | |
|---|---|---|
| KR | 20130078195 A | 7/2013 |
| KR | 20140130459 A | 11/2014 |

(Continued)

*Primary Examiner* — Anthony R Shumate
(74) *Attorney, Agent, or Firm* — McCoy Russell LLP

(57) ABSTRACT

Provided is a method of producing a composite membrane in the form of laminated membranes in which a plurality of isoporous membranes are laminated, wherein the plurality of membranes laminated have through-holes having different sizes from each other and each membrane have the through-holes having the same size.

17 Claims, 4 Drawing Sheets

(56) References Cited

U.S. PATENT DOCUMENTS

| | | | |
|---|---|---|---|
| 2006/0015138 A1* | 1/2006 | Gertner | A61F 2/01 606/200 |
| 2008/0274282 A1* | 11/2008 | Bent | C23C 16/45525 427/255.28 |
| 2010/0078371 A1* | 4/2010 | Saito | F01M 11/03 210/181 |
| 2014/0099464 A1* | 4/2014 | Archbold | B29C 51/268 428/137 |
| 2017/0203255 A1* | 7/2017 | Mundrigi | B01D 69/06 |
| 2017/0225103 A1* | 8/2017 | Geiger | B01D 29/41 |
| 2017/0282127 A1* | 10/2017 | Yang | B01D 71/024 |
| 2018/0015425 A1* | 1/2018 | Hirsch | B01D 69/10 |
| 2019/0009219 A1* | 1/2019 | Teranishi | B01D 63/066 |
| 2019/0232218 A1* | 8/2019 | Kunieda | B01D 39/00 |
| 2019/0282966 A1* | 9/2019 | Seo | B01J 39/18 |
| 2020/0016540 A1* | 1/2020 | Zhao | B01D 61/50 |
| 2020/0129930 A1* | 4/2020 | Tan | B01D 71/56 |
| 2021/0010659 A1* | 1/2021 | Jiang | F21V 17/02 |
| 2021/0146309 A1* | 5/2021 | Banju | B01D 69/06 |
| 2022/0250009 A1* | 8/2022 | Lima | B01D 39/1692 |
| 2022/0288538 A1* | 9/2022 | Hoshino | B01D 69/10 |

FOREIGN PATENT DOCUMENTS

| | | | |
|---|---|---|---|
| KR | 20150041002 A | 4/2015 | |
| WO | WO-2013113928 A1 * | 8/2013 | B01D 63/081 |

* cited by examiner

COMPOSITE MEMBRANE AND PREPARATION METHOD THEREOF

CROSS REFERENCE TO RELATED APPLICATION

The present application claims priority to Korean Patent Application No. 10-2019-0176188, entitled "COMPOSITED MEMBRANE AND PREPARATION METHOD THEREOF", and filed on Dec. 27, 2019. The entire contents of the above-listed application is hereby incorporated by reference for all purposes.

TECHNICAL FIELD

The following disclosure relates to a new method of producing a membrane using a patterned stamp, and in particular, to a new method of producing a composite membrane having an isoporous membrane layer which may be used for a water treatment separator, a fine dust filter, an air filter, an emulsion filter, a battery separator, and the like.

BACKGROUND

A refinement technology by a separator is important in various industrial processes and daily human life. For example, separation of a mixture using a membrane technology may greatly decrease energy costs in an industrial process.

However, when a conventional membrane is produced, the membrane does not have a precisely uniform pore size, that is, an isoporous pore size, thereby having a limitation in a precise separation technology. In addition, since it was difficult to produce pores having a repetitive uniform shape by reproduction, a number of studies are in progress on a membrane having uniform pores to cover such difference in pores and a method of producing the same, but a method of producing a membrane having sufficiently uniform pores has not been developed yet.

For example, as a conventional separator, a method of producing a separator, by producing a film of the separator and introducing micropores with stretching or with adding an additive such as inorganic particles or organic particles which are soluble in a separator mixture and dissolving and removing the additive, is commonly known, but the membrane has different pore sizes, so precise filtering or uniform permeability which may be obtained by uniform pores may not be obtained.

For example, in order to produce an emulsion having particles having a uniform size by filtering an agglomerate and the like for obtaining an emulsion having a uniform size, pores of a filter should have a uniform size. However, a filter by a conventional technology has various pore sizes, and thus, may not achieve the above object.

As another production method, Korean Patent Laid-Open Publication No. 10-2015-0041002 (Apr. 15, 2015) discloses a method of partially evaporating a casting composition including a polymer and performing casting to form a film, dipping the film in a non-solvent of the polymer to produce a separator having an isoporous active layer, and producing the separator into a ultrafiltration film or a nanofiltration film. However, the method requires a carbohydrate such as glucose and an amphipathic polymer in the structure of the polymer, the produced pores are micropores connected in a thickness direction and do not have a uniform pore size in a thickness direction so that the sizes of passing particles are also not uniform, and the method may not produce isoporous pores having the same size which linearly pass through in a thickness direction.

RELATED ART DOCUMENTS

Patent Documents

Korean Patent Laid-Open Publication No. 10-2015-0041002 (Apr. 15, 2015)

SUMMARY

An embodiment of the present invention is directed to providing a composite membrane having an isoporous membrane formed through-holes having the same size in a thickness direction and a method of producing the same.

Another embodiment of the present invention is directed to providing a composite membrane in which a plurality of isoporous membranes are laminated, wherein the laminated plurality of membranes have through-holes having different sizes from each other, and a method of producing the same.

Another embodiment of the present invention is directed to providing a composite membrane in which a plurality of isoporous membranes are laminated, the composite membrane having hierarchical pores in which a size of pores of a membrane layer formed according to a lamination order is decreased, and a method of producing the same.

Another embodiment of the present invention is directed to providing a method of producing a composite membrane in which the composite membrane is formed on a mesh substrate having a larger-sized mesh than the through-hole.

Another embodiment of the present invention is directed to providing a method of producing a composite membrane in which the composite membrane has through-holes having a size of 100 nm to 1000 μm, formed on the mesh substrate.

Still another embodiment of the present invention is directed to providing a composite membrane, produced from a curable type material.

In one general aspect, a method of producing a composite membrane having a membrane layer having through-holes formed therein on a mesh substrate includes:
(i) on a stamp on which patterns for forming through-holes are formed, applying a curable composition in an amount exceeding an amount to fill the patterns, to form an applied layer;
(ii) on a mesh substrate, laminating the applied layer of the stamp so that the applied layer faces the mesh substrate, whereby the curable composition applied in an amount exceeding an amount of the applied layer flows into holes of the mesh substrate to be anchored (anchoring);
(iii) curing; and
(iv) peeling off the stamp.

In an exemplary embodiment, the through-holes may be an isoporous membrane layer having the same size.

In the exemplary embodiment, a size of the through-holes may be different from a size of holes of the mesh substrate.

In the exemplary embodiment, the size of the through-holes may be smaller than the size of the holes of the mesh substrate.

In the exemplary embodiment, the size of the through-holes may be larger than the size of the holes of the mesh substrate.

In the exemplary embodiment, the mesh substrate may be formed of any one material selected from the group consisting of metals, inorganic materials, and polymer resins of 5 to 3000 mesh.

In the exemplary embodiment, the stamp may be formed of any one or two or more components selected from the group consisting of resins, metals, ceramics, silicon, metal oxides, metal nitrides, and metal carbides, and a pattern corresponding to the through-holes may be formed in a concave-convex shape on one surface of the stamp.

In the exemplary embodiment, the through-holes of the membrane layer may have a size of 100 nm to 2000 μm.

In the exemplary embodiment, the production method may be a continuous production method in which steps (i) to (iv) are continuously performed.

In the exemplary embodiment, the curable resin composition may be a thermal-curable or UV-curable resin composition.

In the exemplary embodiment, as the curable composition, it is preferred to use the photocurable resin using an acrylic curable resin for reducing a manufacturing time, but since the composition may be cured using the acrylic curable resin composition or the thermal-curable resin using polysiloxane or the like, a curing method is not limited to thermal-curing or photocuring.

In addition, the membrane or a plurality of membrane layers may be laminated on the mesh substrate by drying without curing after producing by the production method using a thermoplastic resin solution composition, and thus, production by drying using a thermoplastic resin is not excluded.

In the exemplary embodiment, the curable composition may further include functional inorganic particles. Specifically, the inorganic particles may include photocatalyst particles such as titanium dioxide ($TiO_2$), zinc oxide (ZnO), CdS, $ZrO_2$, $SnO_2$, and $V_2O_5$ particles and antibacterial particles such as silver (Ag), but are not limited thereto. The inorganic particle may have a nanosize or microsize, but is not limited thereto.

In another general aspect, a method of producing a composite membrane having two or more membrane layers having through-holes formed therein on a mesh substrate includes:
  a) preparing a second stamp on which patterns to form through-holes having a different size from through-holes of a membrane layer of the composite membrane produced according to the exemplary embodiment are formed, and applying a curable composition in an amount of exceeding an amount to fill the patterns to form a second applied layer;
  b) on the membrane layer of the composite membrane, laminating the applied layer of the second stamp so that the applied layer faces the membrane layer, whereby the curable composition applied in an amount exceeding an amount of the applied layer flows into the through-holes of the membrane layer to be anchored (anchoring);
  c) curing; and
  d) peeling off the stamp.

In an exemplary embodiment, the two or more membrane layers may have a hierarchical pore structure in which the membranes are laminated so that the size of the pores is increased or decreased according to a lamination order.

In the exemplary embodiment, each of the two or more membrane layers may have isoporous pores.

In the exemplary embodiment, the production method may be a continuous production method in which steps a) to d) are continuously performed.

In the exemplary embodiment, the curable resin composition may be a thermal-curable or UV-curable resin composition.

In the exemplary embodiment, the curable resin composition may be a thermoplastic resin composition.

In the exemplary embodiment, the curable resin composition may further include functional inorganic particles.

In another general aspect, a composite membrane in which a porous membrane layer is laminated on a mesh substrate is provided, wherein the porous membrane layer is extended into holes of the mesh substrate to be anchored and bonded.

In an exemplary embodiment, the porous membrane layer may be an isoporous membrane layer having through-holes having the same size.

In the exemplary embodiment, a size of the through-holes may be different from a size of holes of the mesh substrate.

In the exemplary embodiment, the size of the through-holes may be smaller than the size of the holes of the mesh substrate.

In the exemplary embodiment, the mesh substrate may be 5 to 3000 mesh, and the porous membrane layer may have isoporous pores having a uniform size selected from 100 nm to 2000 μm.

In still general aspect, a composite membrane in which two or more porous membrane layers are laminated on a mesh substrate is provided, wherein the porous membrane layer is extended into holes of the mesh substrate to be anchored and bonded.

In an exemplary embodiment, the two or more porous membrane layers may have a hierarchical pore structure in which the membrane layers are laminated so that the size of the pores is increased or decreased according to a lamination order.

In the exemplary embodiment, each of the two or more porous membrane layers may have isoporous pores.

In the exemplary embodiment, the mesh substrate may be 5 to 3000 mesh, and the two or more membrane layers may have isoporous pores having a uniform size selected from 100 nm to 2000 μm and may have hierarchical pores so that a size of pores of the formed membrane layer is increased or decreased according to a lamination order.

Other features and aspects will be apparent from the following detailed description, the drawings, and the claims.

DETAILED DESCRIPTION

Figure 1A:
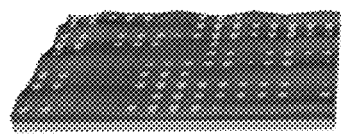
FIG. 1A, FIG. 1B, and FIG. 1C are schematic diagrams of a production method of the present invention.

Hereinafter, the present invention will be described in more detail with reference to specific examples and exemplary embodiments including the accompanying drawings. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by a person skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In the present invention, the term "through-hole" means "pore".

Hereinafter, exemplary embodiments of the present invention will be described.

First, an embodiment of the present invention provides a method of producing a composite membrane having a membrane layer having through-holes (pores) formed therein on a mesh substrate, including:
- (i) on a stamp on which patterns for forming through-holes are formed, applying a curable composition in an amount exceeding an amount to fill the patterns, to form an applied layer;
- (ii) on a mesh substrate, laminating the applied layer of the stamp so that the applied layer faces the mesh substrate, whereby the curable composition applied in an amount exceeding an amount of the applied layer flows into holes of the mesh substrate to be anchored (anchoring);
- (iii) curing; and
- (iv) peeling off the stamp.

In an exemplary embodiment, the mesh substrate is formed of any one material selected from the group consisting of metals, inorganic materials, and polymer resins of 5 to 3000 mesh, the stamp is formed of any one or two or more components selected from the group consisting of resins, metals, ceramic, silicone, metal oxides, metal nitrides, and metal carbides, and a pattern corresponding to the pores is formed on one surface of the stamp. Here, the pattern may be formed in a concave-convex shape, and for example, the through-holes of the membrane layer may be formed in a concave shape in the same shape of convex portions.

In an exemplary embodiment of the present invention, a size of the pores (through-holes) of the membrane layer is not particularly limited, but for example, may be 100 nm to 2000 μm.

In addition, the production method of the present invention may be a continuous production method which is continuously performed.

In addition, in another embodiment of the present invention, a composite membrane having a membrane layer having through-holes formed therein on the mesh substrate produced above instead of the mesh substrate, may be used, and more preferably, two or more membrane layers in which through-holes having a different size from a size of pores of the membrane layer are formed may be laminated on the membrane layer of the composite membrane.

Specifically, for example, a method of producing a composite membrane having two or more membrane layers having through-holes formed therein on a mesh substrate, including:
- a) preparing a second stamp on which patterns to form through-holes having a different size from through-holes of a membrane layer of the composite membrane produced according to the exemplary embodiment are formed and applying a curable composition in an amount of exceeding an amount to fill the patterns to form a second applied layer;
- b) on the membrane layer of the composite membrane, laminating the applied layer of the second stamp so that the applied layer faces the membrane layer, whereby the curable composition applied in an amount exceeding an amount of the applied layer flows into the through-holes of the membrane layer to be anchored (anchoring);
- c) curing; and
- d) peeling off the stamp, is provided.

In an exemplary embodiment of the present invention, the two or more membrane layers may be a composite membrane having a hierarchical pore structure in which the membrane layers are laminated so that a size of pores is increased or decreased according to a lamination order.

In addition, each layer of the composite membrane having a hierarchical pore structure may have isoporous pores having the same size for each layer.

In addition, the present invention relates to a method of producing a composite membrane which is a continuous production method producing the composite membrane having a plurality of membrane layers continuously.

In the exemplary embodiment of the present invention, the curable resin composition may be a thermal-curable or UV-curable resin composition, and the curable resin composition may be replaced with the thermoplastic resin composition.

Therefore, the present invention may also provide a composite membrane in which a porous membrane layer formed on a mesh substrate is laminated, wherein the membrane layer is extended into mesh pores of the mesh substrate to be anchored and bonded.

In addition, the present invention may provide a composite membrane in which two or more porous membrane layers formed on a mesh substrate are laminated, wherein the membrane layer is extended into mesh pores of the mesh substrate to be anchored, the membrane layer is selected from 100 nm to 2000 μm, and the composite membrane has hierarchical pores so that the formed pores of the membrane layer are increased or decreased according to a lamination order.

Hereinafter, exemplary embodiments of the present invention will be described in detail.

First, according to the first aspect of the present invention, a method of producing a composite membrane in which a membrane having the same through-holes formed therein is formed on a mesh substrate is a method of a composite membrane having a membrane layer having isoporous through-holes (pores) formed therein on a mesh substrate including:
- (i) on a stamp on which patterns for forming through-holes on the mesh substrate are formed, applying a curable composition in an amount exceeding an amount to fill the patterns;
- (ii) laminating an applied layer formed on the stamp so that the applied layer faces the mesh substrate, whereby the exceeding amount of the applied layer flows into mesh of the mesh substrate to be anchored (anchoring);
- (iii) curing; and
- (iv) peeling off the stamp.

In addition, a method of producing a composite membrane of the present invention, characterized in that the through-holes are isoporous through-holes having the same size, is provided.

In addition, the present invention may provide a method of producing a composite membrane in which a second membrane layer is formed, in which another isoporous pores (through-holes) are formed on the membrane layer (the first membrane layer being referred to as a first membrane layer) formed on the mesh substrate of the composite membrane.

In the production method, a pattern stamp coated with an excessive amount of the curable composition is laminated on the first membrane layer, anchoring is performed, curing is performed, and the stamp is released, in which pores of the second membrane may be made smaller than pores of the first membrane layer to produce a composite membrane which is laminated so as to form hierarchical isoporous pores. Otherwise, the pores of the second membrane layer may be made larger than the pores of the first membrane layer to produce a composite membrane which is laminated so as to form hierarchical isoporous pores.

Figure 1B:
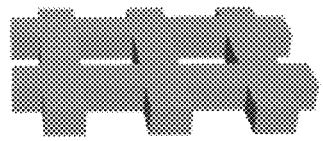
Figure 1C:
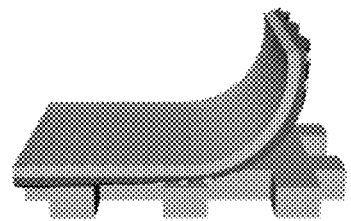
Figure 1C:
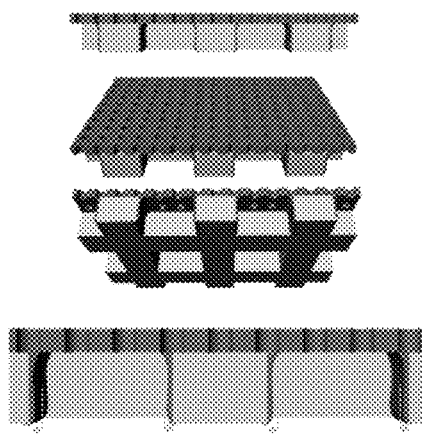

The above production method will be described mainly with reference to FIGS. 1A to 1C schematically expressing the production method.

First, FIG. 1A illustrates a state in which a curable composition is applied in an excessive amount on a patterned stamp or a state in which after the curable composition is applied in an excessive amount, a portion exceeding the excessive amount of the curable composition, that is, the curable composition remaining on the surface after being stored in the pattern is partially scraped, and the lower portion of the drawing illustrates a mesh substrate. As the mesh substrate, various mesh forms may be used without limitation in the present invention, and for example, metals, inorganic materials, and organic materials in an insect screen net are all included, and as an example, a form like a mosquito net, a nonwoven fabric, and a woven fabric may all be included. As the stamp, silicone, metallic, inorganic, and organic stamps may be all used, and grooves in a concave-convex shape are formed on one side surface and these grooves provide a membrane forming pores (through-holes).

The stamp in which a pattern forming pores is formed of the present invention is not particularly limited as long as the stamp has a pattern imparting isoporous pores of the present invention being embossed, but for example, any stamp which may be not dissolved or changed in a curable resin composition and maintain the form as it is, for example, resin stamps such as polydimethylsiloxane and polyolefin, various metal stamps, inorganic stamps such as ceramic, silicone, metal oxides, metal nitrides, metal carbides, and the like, may be used.

Next, FIG. 1B will be described. FIG. 1B shows a state in which after the curable resin composition is applied in an excessive amount on the stamp of FIG. 1A, the composition on the stamp is laminated on the mesh substrate of FIG. 1A. In FIG. 1B, the stamp on which the curable resin composition is applied in an excessive amount is laminated on the mesh substrate, the curable composition applied in an excessive amount flows to migrate into the mesh pores of the mesh substrate, so that the mesh substrate and the curable composition are integrally anchored. Thereafter, when a specific excessive amount of the curable composition flows into the pores of the mesh substrate, and then is cured by UV or heat, the curable composition migrating into the mesh pores by curing is also cured together.

Therefore, when the stamp is peeled off after curing, a composite membrane in which a membrane layer having pores (through-holes) having the same size formed therein and partially anchored to the mesh substrate is formed, is produced, as shown in FIG. 1C.

In the present invention, the size of the isoporous pores (through-holes) of the membrane layer is not particularly limited, but for example, the size may be 100 nm to 2000 µm, preferably 200 nm to 1000 µm, and the thickness may be in a range of 1 to 10000 µm, preferably 2 to 1000 µm; however, the size is not limited thereto as long as the purpose of the present invention is achieved.

In addition, as another exemplary embodiment, a composite membrane in which one or more another membrane layers having isoporous pores formed therein are formed on the membrane layer formed on the mesh substrate layer, may be provided.

The composite membrane may have membrane layers of a hierarchical pore structure having hierarchical isoporous membrane layers in which the membrane layer has pores (through-holes) having an increased or decreased size from an upper portion of the mesh substrate.

Next, the curable composition of the present invention will be described.

The curable composition may be adopted without limitation as long as it is cured by energy such as heat and UV radiation, and it is also possible to perform coating using a composition in which a thermoplastic resin is dissolved, but in the present invention, description will be centered on a curable resin.

The thermal-curable resin composition of the present invention may refer to a composition including a) curable compound(s) including an ethylenic unsaturated group; b) a crosslinking agent including two or more ethylenic unsaturated groups; c) an inactive solvent; and d) an initiator.

As a specific example, the thermal-curable resin composition may include:

a) 10 to 80 wt % of the compound(s) including one ethylenic unsaturated group;
b) 0.1 to 40 wt % of the crosslinking agent including at least two ethylenic unsaturated groups;
c) 5 to 60 wt % of the inactive solvent; and
d) 0.01 to 5 wt % of the initiator, but is not limited thereto.

Preferably, a radiation-curable composition lacks a catalyst, for example, noble metal particles (for example, platinum, palladium, osmium, iridium, rhodium, and/or ruthenium particles, and particles including an alloy including any one thereof).

The composition is applied on a stamp on which grooves corresponding to the pores of the membrane layer are patterned, the stamp may be made of paper, resins, metals, inorganic materials, and the like, and a stamp made of polydimethylsiloxane is preferred with a high stability to a solvent. The curable composition is applied on the stamp in an amount to fill the pattern and leave an excess to be then anchored to the mesh substrate, the applied layer is laminated so that the mesh substrate and the applied layer face each other, the excessive curable composition migrates into the mesh to form anchoring, the curable composition is cured by heat, UV, or radiation, and the stamp is removed, so that the membrane layer having isoporous pores formed therein is formed on the mesh substrate.

For example, an insect screen film as a mesh substrate includes a network of metal wires, in which gaps are formed between the wires and an excessive curable composition migrates through the gap and is anchored.

In addition, another membrane layer may be laminated using a stamp having smaller pores than the pores (through-holes) of the membrane layer on the membrane layer formed on the mesh substrate, in which the curable composition of the upper membrane layer may migrate into the pores of the lower membrane layer to be anchored, or otherwise, when the curable resin composition is used with the same component, adhesive strength is increased so as to be inseparable.

As a preferred exemplary embodiment, the production method of the present invention may be continuously performed. In the continuous production method of the present invention, the curable composition is continuously incorporated into the pattern of the stamp and stored while the stamp moves, and simultaneously, an excessive amount of the curable composition remains on the surface of the stamp, the curable resin composition coating layer is then laminated with the mesh substrate and moves to a curing zone, and the stamp is continuously peeled off after moving to the curing zone, thereby continuously producing the composite membrane in which an isoporous membrane layer coated on the mesh substrate is formed.

In addition, a single-layered composite membrane produced above is used as another mesh substrate, thereby producing a composite membrane having hierarchical isoporous pores in which two or three membrane layers are continuously laminated.

In addition, an exemplary embodiment of the present invention may include forming pores of various sizes which are designed beforehand, together on one membrane.

In addition, as an exemplary embodiment of the present invention, a stamp coated with the curable resin is laminated continuously or sequentially on both side surfaces of the mesh substrate, thereby also providing a composite membrane having pores having a predetermined shape on both surfaces of the mesh substrate as a reinforcing layer.

The present invention may include a mesh formed from a fabric material (for example, a polymer fabric or a textile material) or a metal (for example, nickel or stainless steel).

The mesh substrate of the present invention is not particularly limited, but may include a mesh substrate having the mesh number of 5 to 3000, more preferably 10 to 1000.

An example of the mesh substrate may include an insect screen net, a mosquito net, and the like, without limitation, and a commercial example thereof may include JMC Monoplan mesh and Wangi mesh (Druma, Netherlands), a stainless steel mesh from Reking of China, Newman Roller Mesh (Stretch Devices, U.S.A.), and the like.

In the present invention, a preferred ethylenic unsaturated group in the curable resin composition may be a (meth)acryl group or (meth)acrylamide group, a vinyl group, an allyl group, and the like, in particular an acryl group, for example, an acrylate group, an acrylamide group, or the like.

The crosslinking agent of the present invention is not particularly limited as long as it is a compound having two or more crosslinking groups and a combination thereof, but for example, may be composed of 2 to 6 crosslinking working agent. An example of the crosslinking agent includes, without limitation, tetraethylene glycol diacrylate, propoxylated (3) trimethylolpropane triacrylate, diipropylene glycol diacrylate, tripropylene glycol diacrylate, pentaerythritol triacrylate, pentaerythritol tetraacrylate, propoxylated ethylene glycol diacrylate, bisphenol A ethoxylate (1.5) diacrylate, tricyclodecane dimethanol diacrylate, ethoxylated (4) pentaerythritol tetraacrylate, dipentaerythritol pentaacrylate, and a methacrylate substituent component thereof, N,N'-methylene bisacrylamide, N,N'-ethylene bisacrylamide, N,N'-propylene bisacrylamide, N,N'-butylene bisacrylamide, N,N'-(1,2-dihydroxyethylene) bisacrylamide, 1,4-diacryloyl piperazine, and the like, but a person skilled in the art will understand well that it is not limited thereto.

The inactive solvent is not particularly limited as long as it dissolves a solid component, and for example, may include solvents such as ether, alcohol, carbonate, ester, ketone, hydrocarbon, and halocarbon, various solvents such as isopropyl alcohol, ethyl acetate, toluene, cyclohexane, dialkyl ether, and methylethylketone may be used, and also, ethylene glycol, propylene glycol, and polyalkylene glycol, 2-methoxyethyl ether, 2-methoxyethanol, 2-ethoxyethanol, 2-propoxyethanol, 2-isopropoxyethanol, 2-butoxyethanol, monomethyl, propylene carbonate, diethyl carbonate, and glycerol carbonate of ethylene glycol and triethylene glycol, dimethyl sulfoxide, formamide, dimethyl formamide, and the like may be used, but the present invention is not limited thereto.

The initiator of the present invention may be selected from thermal initiators and photoinitiators, and an example of the photoinitiator may include 2-hydroxy-2-methyl-1-phenyl propane-1-one and 2-hydroxy-2-methyl-1-(4-tert-butyl-) phenylpropane-1-one), acylphosphine oxide (for example, 2,4,6-trimethylbenzoyl-diphenylphosphine oxide, and bis(2,4,6-trimethylbenzoyl)-phenylphosphine oxide), and the like and an example of the thermal initiator may include both peroxides and azo compounds, and further description will be omitted in the present invention.

In addition, the curable resin composition of the present invention may further include additional components such as an antifoaming agent and a thickener.

In addition, the curable resin composition of the present invention may further include functional inorganic particles, if necessary. Specifically, the inorganic particles may include photocatalyst particles such as titanium dioxide ($TiO_2$), zinc oxide (ZnO), CdS, $ZrO_2$, $SnO_2$, and $V_2O_5$ particles and antibacterial particles such as silver (Ag), but are not limited thereto. The inorganic particles may have a nanosize or microsize, specifically, for example, may be 10 nm to 500 μm, but are not limited thereto. In addition, a content of the functional inorganic particles is not limited within a range of not impairing moldability of the composite membrane. Specifically, for example, the functional inorganic particles may be included at 0.01 to 30 wt %, more preferably 0.1 to 20 wt % in the total curable resin composition, but are not limited thereto.

The curable resin composition of the present invention may have a high viscosity preferably when measuring the viscosity at a low shear rate.

The composite membrane of the present invention may be used for various applications such as a water treatment field, selective separation of salt and/or metal, a deionization apparatus (CDI), and a dialyzer.

Hereinafter, the specific exemplary embodiments of the present invention will be described using drawings.

First, FIG. 1A illustrates a state in which a curable composition is applied in an excessive amount on a patterned stamp or a state in which after the curable composition is applied in an excessive amount, a portion exceeding the excessive amount of the curable composition, that is, the curable composition remaining on the surface after being stored in the pattern is partially scraped, and the lower portion of the drawing illustrates a mesh substrate.

Next, FIG. 1B shows a state in which after the curable resin composition is applied in an excessive amount on the stamp of FIG. 1A, the composition on the stamp is laminated on the mesh substrate of FIG. 1A.

FIG. 1C shows a composite membrane in which pores (through-holes) of the same size produced after peeling off the stamp are formed.

Figure 2:
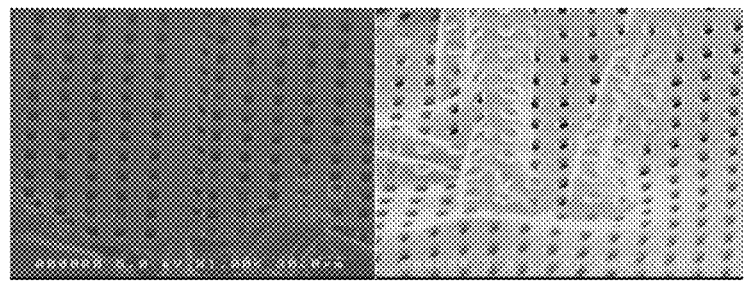
FIG. 2 shows an isoporous membrane layer formed on a polysulfone fabric, produced by the method of the present invention.

FIG. 2 shows an isoporous membrane layer formed on a polysulfone fabric produced according to an exemplary embodiment of the present invention.

Figure 3:
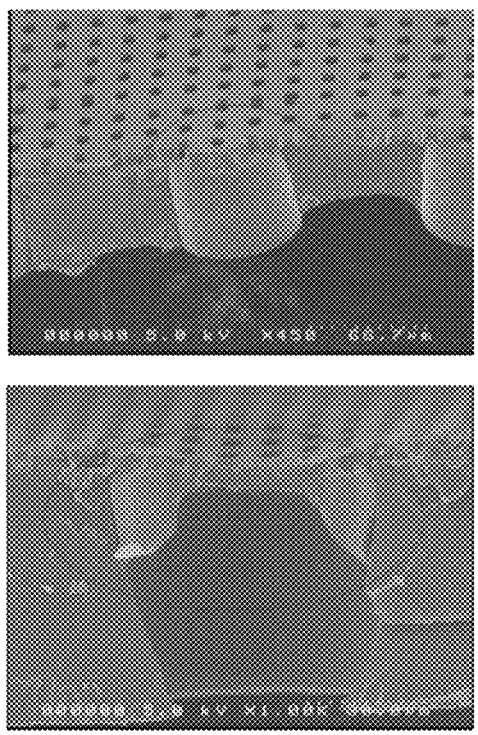
FIG. 3 shows a composite membrane having hierarchical pores in which a membrane layer having pores of 800 nm is formed on the membrane layer having pores of 500 μm formed therein produced by the method of the present invention, and an interlayer anchored phenomenon.

FIG. 3 shows a composite membrane having hierarchical pores in which a membrane layer having pores of 800 nm is formed on the membrane layer having pores of 500 μm formed therein produced by the method of the present invention, and an interlayer anchored phenomenon.

Figure 4:
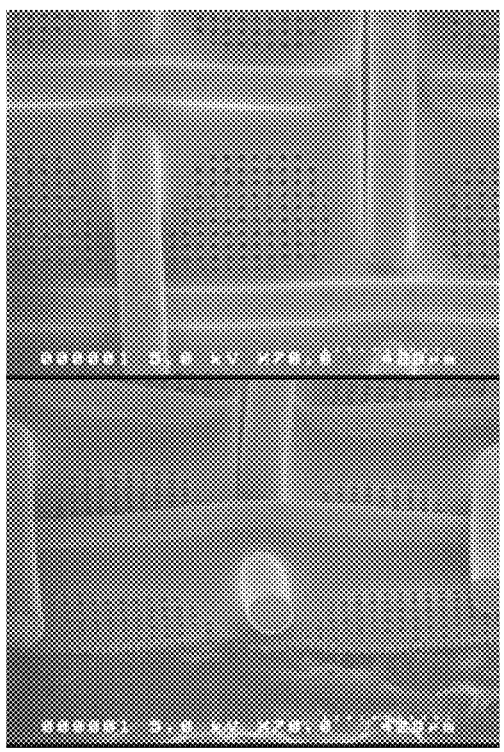
FIG. 4 is a photograph of an isoporous membrane layer formed on an insect screen film with metal mesh.

FIG. 4 is a photograph of an isoporous membrane layer formed on an insect screen film with metal mesh.

The present invention may provide a composite membrane having an isoporous pore membrane layer in a thickness direction on a mesh substrate, in which the isoporous pore membrane layer is one or two or more and has different through-holes, but a size of the through-holes in each layer is the same, and a method of producing the same.

In addition, the composite membrane of the present invention may provide a method of producing a composite membrane in which a resin component in the isoporous membrane layer is extended into a mesh of the mesh substrate to be anchored, so that the composite membrane has an unseparated form.

In addition, in the present invention, the composite membrane may be produced by repeating a stamp peel-off step twice or more to laminate a membrane having a plurality of isoporous through-holes on the mesh substrate, where the size of the isoporous through-holes in each layer may be produced differently from each other and the composite membrane may be more easily and more rapidly produced.

In particular, the size of the isoporous through-holes is decreased according to a lamination order of the membrane layers on the mesh substrate, thereby producing a composite membrane having a hierarchical porous multilayer membrane having different isoporous through-holes in a lamination order.

The composite membrane according to the present invention may be applied to a water treatment separator, a fine dust filter, an air filter, an emulsion filter, a battery separator, and the like.

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A method of producing a composite membrane having a membrane layer having through-holes formed therein on a mesh substrate, the method comprising:
   (i) on a stamp on which patterns for forming through-holes are formed, applying a curable composition in an amount exceeding the amount to fill the patterns, to form an applied layer;
   (ii) on the mesh substrate, laminating the applied layer of the stamp so that the applied layer faces the mesh substrate, whereby the curable composition applied in the amount exceeding the amount of the applied layer flows into holes of the mesh substrate to be anchored (anchoring);
   (iii) curing; and
   (iv) peeling off the stamp.

2. The method of producing the composite membrane of claim 1, wherein the membrane layer is an isoporous membrane layer having the through-holes having the same size.

3. The method of producing the composite membrane of claim 1, wherein a size of the through-holes is different from a size of holes of the mesh substrate.

4. The method of producing the composite membrane of claim 1, wherein the mesh substrate is formed of any one material selected from the group consisting of metals, inorganic materials, and polymer resins of 5 to 3000 mesh.

5. The method of producing the composite membrane of claim 1, wherein the stamp is formed of any one or two or more components selected from the group consisting of resins, metals, ceramics, silicone, metal oxides, metal nitrides, and metal carbides, and a pattern corresponding to the through-holes is formed on one surface of the stamp.

6. The method of producing the composite membrane of claim 1, wherein the through-holes of the membrane layer has a size of 100 nm to 2000 μm.

7. The method of producing the composite membrane of claim 1, wherein the method is a continuous production method in which (i) to (iv) are continuously performed.

8. The method of producing the composite membrane of claim 1, wherein the curable composition is a thermal-curable or UV-curable resin composition.

9. The method of producing the composite membrane of claim 1, wherein the curable composition is a thermoplastic resin composition.

10. The method of producing the composite membrane of claim 1, wherein the curable composition further includes functional inorganic particles.

11. A method of producing a composite membrane having two or more membrane layers having through-holes formed therein on a mesh substrate, the method comprising:
   a) preparing a second stamp on which patterns to form through-holes having a different size from through-holes of the membrane layer of the composite membrane produced by the method of claim 1 are formed and applying a curable composition in an amount of exceeding an amount to fill the patterns to form a second applied layer;
   b) on the membrane layer of the composite membrane, laminating the applied layer of the second stamp so that the applied layer faces the membrane layer, whereby the curable composition applied in an amount exceeding an amount of the applied layer flows into the through-holes of the membrane layer to be anchored (anchoring);
   c) curing; and
   d) peeling off the stamp.

12. The method of producing the composite membrane of claim 11, wherein the two or more membrane layers have a hierarchical pore structure in which the membrane layers are laminated so that a size of pores is increased or decreased according to a lamination order.

13. The method of producing the composite membrane of claim 11, wherein each of the two or more membrane layers has isoporous pores.

14. The method of producing the composite membrane of claim 11, wherein the method is a continuous production method in which a) to d) for the second stamp are continuously performed.

15. The method of producing the composite membrane of claim 11, wherein the curable composition is a thermal-curable or UV-curable resin composition.

16. The method of producing the composite membrane of claim 11, wherein the curable composition is a thermoplastic resin composition.

17. The method of producing the composite membrane of claim 11, wherein the curable composition further includes functional inorganic particles.

* * * * *